United States Patent
Lee

(10) Patent No.: US 8,503,034 B2
(45) Date of Patent: Aug. 6, 2013

(54) IMAGE FORMING APPARATUS INCLUDING HALFTONE TABLE HAVING DIFFERENT DOT REGIONS AND METHOD OF CONTROLLING THE SAME

(75) Inventor: Jai Yeol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 12/145,730

(22) Filed: Jun. 25, 2008

(65) Prior Publication Data
US 2009/0141309 A1    Jun. 4, 2009

(30) Foreign Application Priority Data
Nov. 29, 2007    (KR) .................. 10-2007-0122443

(51) Int. Cl.
*H04N 1/40* (2006.01)
*G06K 15/02* (2006.01)
(52) U.S. Cl.
USPC ........ 358/3.09; 358/3.06; 358/3.11; 358/3.12
(58) Field of Classification Search
None
See application file for complete search history.

(56) References Cited

U.S. PATENT DOCUMENTS

| | | | | |
|---|---|---|---|---|
| 4,507,685 A * | 3/1985 | Kawamura | ................... | 358/536 |
| 4,924,301 A * | 5/1990 | Surbrook | ...................... | 358/534 |
| 5,235,674 A * | 8/1993 | Cohen-Skalli et al. | ........ | 358/1.1 |
| 6,538,771 B1 * | 3/2003 | Sakatani et al. | ............... | 358/2.1 |
| 6,975,431 B1 * | 12/2005 | Sugizaki | ...................... | 358/3.06 |
| 7,218,420 B1 * | 5/2007 | Tai et al. | ........................ | 358/3.2 |
| 2003/0231367 A1 * | 12/2003 | Quintana | ..................... | 358/527 |
| 2004/0160643 A1 * | 8/2004 | Sugizaki | ...................... | 358/3.06 |
| 2006/0077469 A1 * | 4/2006 | Asai et al. | .................... | 358/3.06 |
| 2007/0159656 A1 * | 7/2007 | Kishimoto | .................. | 358/3.06 |
| 2007/0182996 A1 * | 8/2007 | Nakajima | .................... | 358/3.13 |
| 2007/0216917 A1 * | 9/2007 | Wakasugi | .................... | 358/1.9 |
| 2008/0055614 A1 * | 3/2008 | Qiao et al. | .................... | 358/1.9 |

FOREIGN PATENT DOCUMENTS

| | | |
|---|---|---|
| JP | 2005-99817 | 4/2005 |
| KR | 1020050075229 | 7/2005 |
| KR | 1020060066982 | 6/2006 |

OTHER PUBLICATIONS

Korean Office Action Issued on Jun. 25, 2012 in KR Patent Application No. 10-2007-0122443.

* cited by examiner

*Primary Examiner* — Barbara Reinier
(74) *Attorney, Agent, or Firm* — Stanzione & Kim, LLP

(57) ABSTRACT

An image forming apparatus to connect a video controller to a laser scanning unit through a cable and the video controller includes a halftone table in order to perform a halftone process with respect to an original image. The halftone table includes a dot region having at least two shapes and a non-dot region.

17 Claims, 15 Drawing Sheets

IMAGE FORMING APPARATUS INCLUDING HALFTONE TABLE HAVING DIFFERENT DOT REGIONS AND METHOD OF CONTROLLING THE SAME

CROSS-REFERENCE TO RELATED APPLICATIONS

This application claims priority under 35 U.S.C. §119(a) from Korean Patent Application No. 2007-122443, filed on Nov. 29, 2007 in the Korean Intellectual Property Office, the disclosure of which is incorporated herein in its entirety by reference.

BACKGROUND OF THE INVENTION

1. Field of the Invention

The present general inventive concept relates to an image forming apparatus to process an image using a halftone table and a method of controlling the same.

2. Description of the Related Art

In an image forming operation using an electrophotographic method, a bitmap image which represents pixels by one bit is made by image conversion for binarizing multiple bits used for representing pixels of an image, for example, 8 bits, and a printing operation on a recording medium is performed using the bit map.

An operation for converting pixels of an image received from a host computer into a bitmap image is called a halftone process. At this time, a halftone table is generally used.

The halftone process is performed by a video controller of an image forming apparatus.

In the halftone process, printing quality may be determined depending on which halftone table is used.

Referring to FIG. 1, the existing image forming apparatus M1 includes a video controller 10, a cable 20 and a laser scanning unit (LSU) 30.

The video controller 10 temporarily stores a halftone image, which is subjected to the halftone process, in an internal memory and transmits the halftone image to the LSU 30 through the cable 20 according to a printing process.

The halftone image is transmitted through the cable 20 by one bit string in series.

The halftone table has indexes corresponding to the pixels.

As illustrated in FIG. 2A, if a gray image having a brightness of 50% is printed using the existing halftone table, shapes of dot regions A1, A2 and A3 printed on a recording medium 11 are the same. That is, as illustrated in FIG. 2B, a maximum vertical distance y 1 and a maximum horizontal distance x 1 of any dot region A1 are equal to a maximum vertical distance y2 and a maximum horizontal distance x2 of another dot region A2 adjacent thereto, respectively. Another dot region A3 also has a same shape as the dot region A1.

Referring to FIGS. 1 and 2A, if a halftone image corresponding to any horizontal line L1 of the recording medium 11 is transmitted through the cable 20, a clock signal in which a level 0 corresponding to a non-print portion and a level 1 corresponding to a print portion are repeated as illustrated in FIG. 2C is transmitted. If the clock signal in which the two levels are repeated and the repeated period is constant is transmitted, the clock signal is weak against electromagnetic interference (EMI). If the clock signal is analyzed in a frequency domain using a fast Fourier transform (FFT) algorithm, an amount of EMI may exceed the EMI standard defined in International Organization for Standardization at a specific frequency fa as illustrated in FIG. 2D.

The existing halftone table has regularity in which a predetermined pattern is repeated. When a halftone image generated on a basis of the halftone table is transmitted in series, the EMI may be excessively generated.

SUMMARY OF THE INVENTION

The present general inventive concept reduces EMI generated when a halftone image is transmitted, by using an improved halftone table.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an image forming apparatus including: a halftone table including a plurality of different types of dot regions and a plurality of non-dot regions, and a halftone processor to binarize an original image using the halftone table.

Indexes of the halftone table may vary according to the dot regions and the non-dot regions.

If a plurality of dot regions are included on a horizontal line, different types of dot regions may be arranged in the halftone table.

If two types of dot regions are included on a horizontal line, different types of dot regions may be alternately arranged in the halftone table.

In the halftone table, at least one of the plurality of dot regions may have a large size in a first direction and at least another of the plurality of dot regions may have a large size in a second direction perpendicular to the first direction.

The foregoing and/or other aspects and utilities of the general inventive concept may also be achieved by providing an image forming apparatus including a halftone table including indexes set according to pixels corresponding to at least two types of dot regions and non-dot regions of a recording medium and is used when a halftone process is performed by a halftone processor, the halftone processor to perform the halftone process with respect to the pixels of an original image using the halftone table, and a cable to transmit a clock signal which is obtained by performing the halftone process by the halftone processor and has a plurality of levels.

The plurality of levels may include a first level corresponding to the dot region and a second level corresponding to the non-dot region, and a length of a period having the first level corresponding to the dot region may vary according to shapes of the dot regions included on a horizontal line.

The foregoing and/or other aspects and utilities of the general inventive concept may also be achieved by providing an image forming apparatus including a video controller to binarize an original image and output the binarized image, using a halftone table including a plurality of different types of dot regions and a plurality of non-dot regions, a cable to transmit the binarized image output from the video controller in series, and a laser scanning unit to irradiate laser beams in correspondence with the image received through the cable.

The foregoing and/or other aspects and utilities of the general inventive concept may also be achieved by providing a method of controlling an image forming apparatus, the method including performing a halftone process with respect to a test image using a halftone table, printing the image, which is obtained by performing the halftone process, on a recording medium, checking a print state of an output matter printed on the recording medium, and determining that the halftone table is applied if a plurality of dot regions printed on the recording medium include at least two types of dot regions.

The test image may be a gray image having a brightness of 50%.

The checking of the print state may be performed by observing the image using a magnifier.

The checking of the print state may include scanning the printed output matter, and magnifying the scanned image using a magnification program and observing the scanned image on a screen.

The foregoing and/or other aspects and utilities of the general inventive concept may also be achieved by providing a video controller usable with an image forming apparatus, the video controller including a halftone processor to binarize an original image and output the binarized image, the halftone processor to create the binarized image by associating dot regions with pixels of the original image, wherein adjacent dot regions have at least one of a different shape and size.

The foregoing and/or other aspects and utilities of the general inventive concept may also be achieved by providing an image forming apparatus including a video controller including a halftone processor to binarize an original image and output the binarized image, the halftone processor to create the binarized image by associating dot regions with pixels of the original image such that adjacent dot regions have at least one of a different shape and size, and a cable to transmit the binarized image output from the video controller in series, and a laser scanning unit to irradiate laser beams in correspondence with the image received through the cable.

The dot regions may be obtained through a halftone table having characteristics corresponding to indexes applied to the pixels, and the indexes of the halftone table are related to respective shapes of the dot regions printed on a recording medium.

The foregoing and/or other aspects and utilities of the general inventive concept may also be achieved by providing a method of operating image forming apparatus, the method including creating a binarized image by associating dot regions with pixels of an original image such that adjacent dot regions have at least one of a different shape and size, and transmitting the binarized image in series, and irradiating laser beams in correspondence with the transmitted binarized image.

The foregoing and/or other aspects and utilities of the general inventive concept may also be achieved by providing a computer-readable recording medium having embodied thereon a computer program to execute a method, wherein the method including creating a binarized image by associating dot regions with pixels of an original image such that adjacent dot regions have at least one of a different shape and size, and transmitting the binarized image in series, and irradiating laser beams in correspondence with the transmitted binarized image.

Reducing an amount of EMI generated when a halftone image is transmitted through a cable, by using a halftone table having reduced regularity is possible.

BRIEF DESCRIPTION OF THE DRAWINGS

These and/or other aspects and utilities of the general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
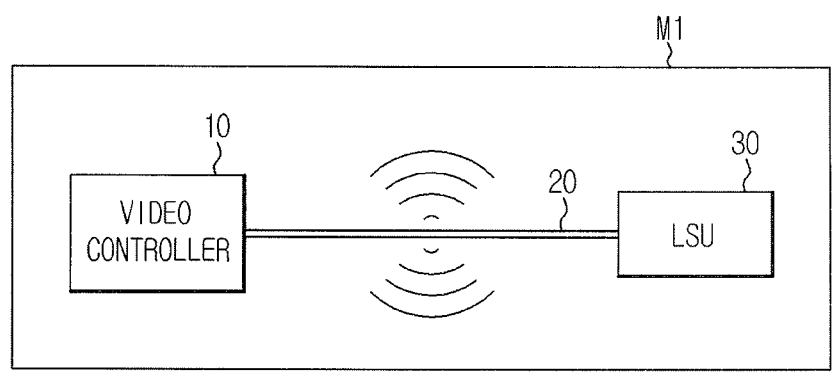
FIG. 1 is a block diagram illustrating an existing image forming apparatus.
Figure 2A:
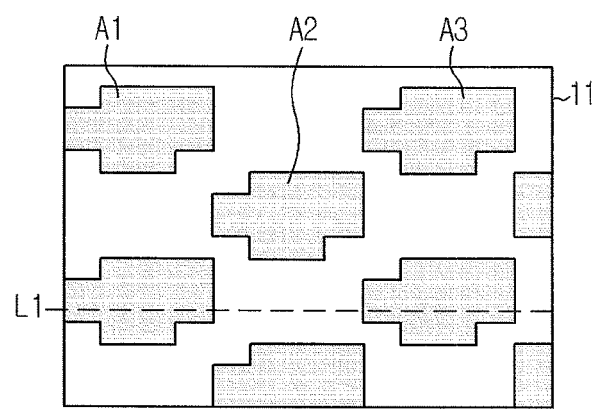
FIG. 2A is a view illustrating a dot region printed on a recording medium using the existing halftone table.
Figure 2B:
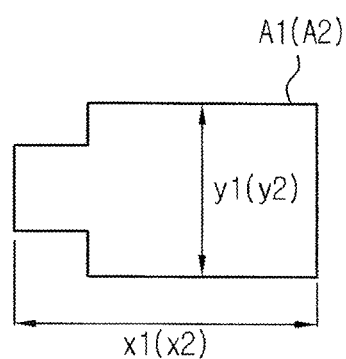
FIG. 2B is a view illustrating a shape of the printed dot region illustrated in FIG. 2A.
Figure 2C:
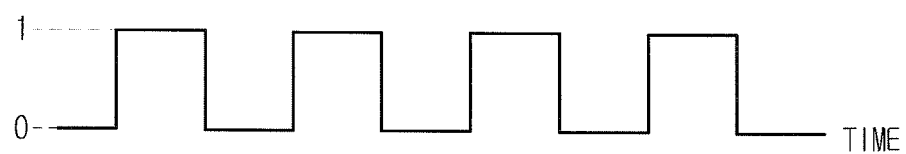
FIG. 2C is a view illustrating an existing clock signal having two levels.
Figure 2D:
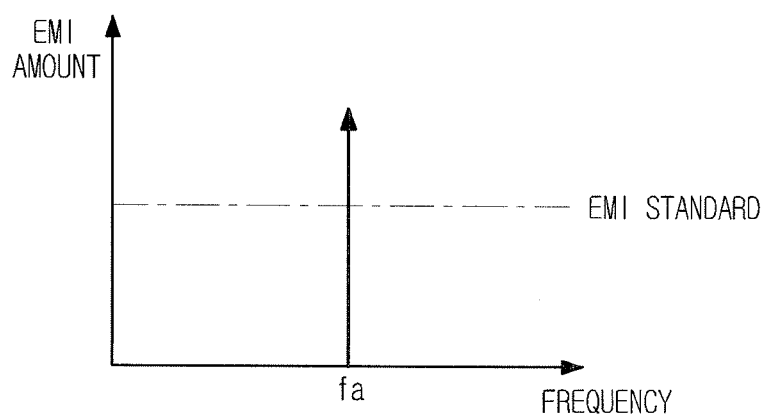
FIG. 2D is a view illustrating electromagnetic interference (EMI) generated when a clock signal is transmitted through a cable.

Reference will now be made in detail to embodiments of the present general inventive concept, examples of which are illustrated in the accompanying drawings, wherein like reference numerals refer to the like elements throughout. The embodiments are described below to explain the present general inventive concept by referring to the figures.

Figure 3A:
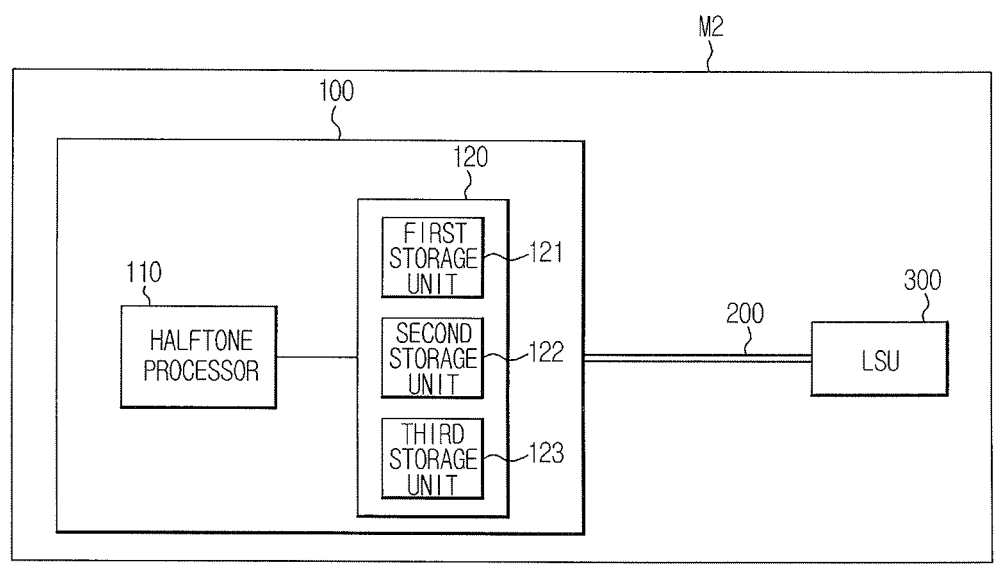
FIG. 3A is a block diagram illustrating an image forming apparatus according to an embodiment of the present general inventive concept.

FIG. 3A is a block diagram illustrating an image forming apparatus according to an embodiment of the present general inventive concept.

The image forming apparatus M2 according to the present embodiment includes a video controller 100, a cable 200 and a laser scanning unit 300.

The video controller 100 includes a halftone processor 110 and a memory 120.

The memory 120 includes a first storage unit 121 to store data related to an original image, a second storage unit 122 to store data related to an improved halftone table, and a third storage unit 123 to store data related to a image which is subjected to a halftone process.

The original image data stored in the first storage unit 121 can be represented by multiple bits in each pixel.

The halftone processor 110 compares original image data corresponding to a pixel from the first storage unit 121 with an index of the halftone table from the second storage unit 122. The halftone processor 110 binarizes the compared result of the original image data and the index of the halftone table to a level 0 or 1, makes a halftone image, and stores the halftone image in the third storage unit 123.

The video controller 100 transmits the halftone image of the third storage unit 123 to the laser scanning unit 300 through the cable 200 according to a printing process. At this time, the halftone image which is temporarily stored in the third storage unit 123 is transmitted by one bit string in series.

The video controller according to the present embodiment performs the halftone process using the improved halftone table such that electromagnetic interference (EMI) is not excessively generated when the halftone image is transmitted through the cable 200.

When the halftone table is prepared, regularity of the halftone image which is obtained by performing the halftone process is reduced in a range in which the original image is not substantially damaged. In particular, reducing the regularity of a horizontal line corresponding to a line scan direction of the laser scanning unit 300 is necessary.

Characteristics of the halftone table are determined according to indexes applied to the pixels. The indexes of the halftone table are finally related to shapes of the dot regions printed on the recording medium.

The indexes of the halftone table are set according to a plurality of dot regions (a plurality of print regions) and a plurality of non-dot regions (a plurality of non-print regions) such that the shapes of adjacent dot regions are different from each other.

Figure 3B:
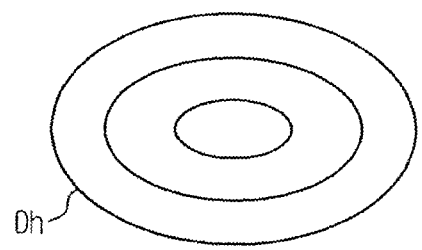
FIG. 3B is a view illustrating an example of a dot region according to an embodiment of the present general inventive concept.
Figure 3C:
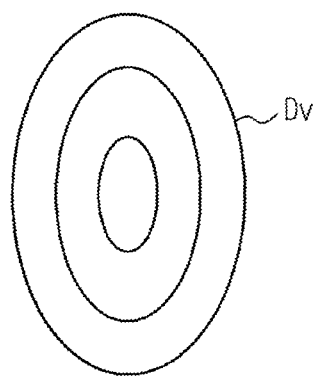
FIG. 3C is a view illustrating another example of a dot region according to an embodiment of the present general inventive concept.

For example, if the dot region is divided into a first pattern dot region Dh having a large size in a horizontal direction as illustrated in FIG. 3B and a second pattern dot region Dv having a large size in a vertical direction, the regularity is reduced in a case where the two pattern dot regions are mixed, rather than a case where only any one of the two pattern dot regions is used.

Figure 3D:
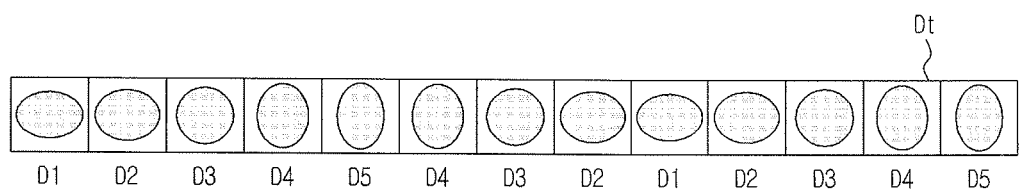
FIG. 3D is a view illustrating a dot shape table according to an embodiment of the present general inventive concept.

The bias direction of the dot region may be variously changed. For example, as illustrated in FIG. 3D, a dot shape table Dt in which five different dot regions D1, D2, D3, D4 and D5 are arranged in a predetermined sequence is previously provided. Desired dot regions are selected from the table so as to prepare a halftone table.

Figure 3E:
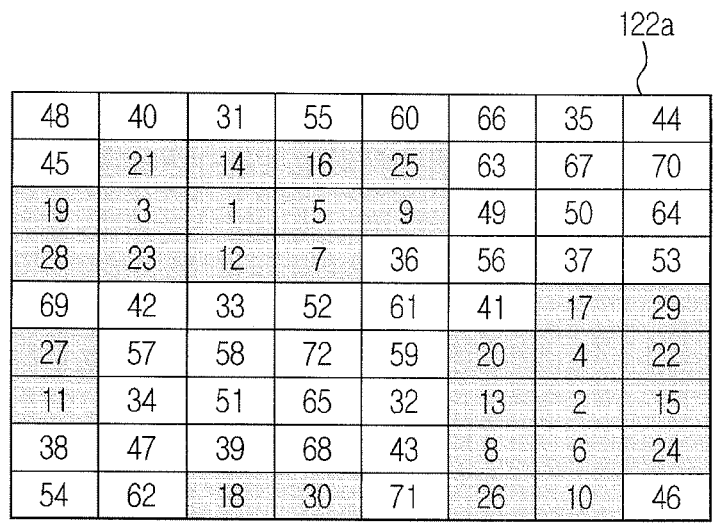
FIG. 3E is a view illustrating an improved halftone table according to an embodiment of the present general inventive concept.

Using such a method of preparing the table, for example, an improved halftone table 122a illustrated in FIG. 3E may be prepared. Here, the indexes of the halftone table 122a are set to be smaller than a threshold in the dot region and are set to be larger than the threshold in the non-dot region.

Figure 4A:
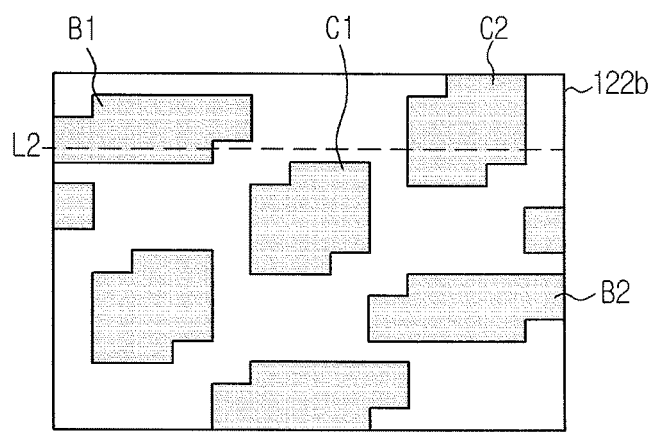
FIG. 4A is a view illustrating dot regions printed on a recording medium using the improved halftone table according to an embodiment of the present general inventive concept.

If a gray image having a brightness of 50% is printed using the improved halftone table 122a, at least two types of dot regions are formed on a recording medium 122b as illustrated in FIG. 4A.

Figure 4B:
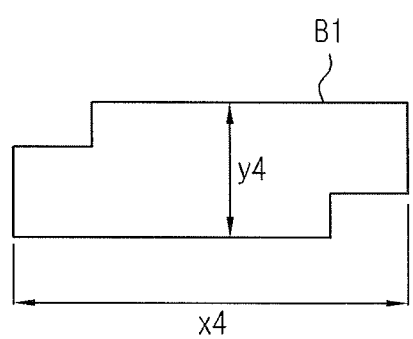
FIGS. 4B and 4C are views illustrating the shapes of the printed dot regions illustrated in FIG. 4A according to an embodiment of the present general inventive concept.
Figure 4C:
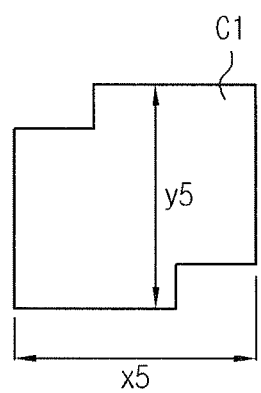

Referring to FIGS. 4A to 4C, while a dot region B1 printed at an upper left end of the improved halftone table 122a has a large size in the horizontal direction, dot regions C1 and C2, which are located adjacent to the dot region B1 and have a shape different from that of the dot region B1, have a large size in the vertical direction. A dot region B2 has the same shape as the dot region B1 which is located at the upper left end of the improved halftone table.

In the dot region B1, a maximum horizontal distance x4 is larger than a maximum vertical distance y4 and, in the dot region C1 which is located adjacent to the dot region B1, a maximum vertical distance y5 is larger than a maximum horizontal distance x5. Here, the maximum horizontal distance x4 of the dot region B1 may be equal to the maximum vertical distance y5 of the dot region C1 and the maximum vertical distance y4 of the dot region B1 may be equal to the maximum horizontal distance x5 of the dot region C1.

Figure 4D:
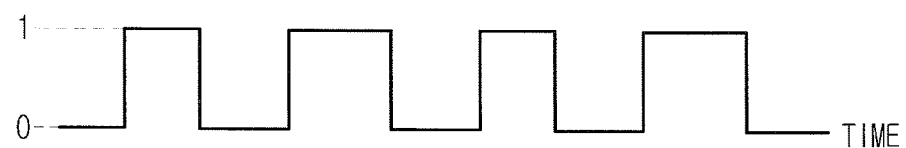
FIG. 4D is a view illustrating a clock signal having two levels according to an embodiment of the present general inventive concept.
Figure 4E:
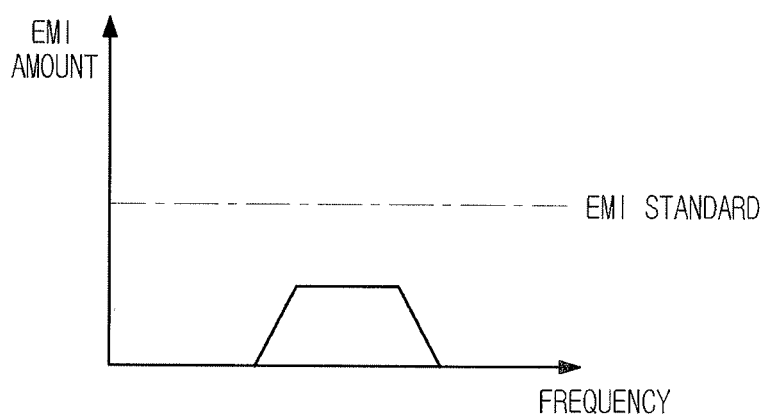
FIG. 4E is a view illustrating an amount of EMI generated when the clock signal illustrated in FIG. 4D is transmitted through a cable.

If the halftone image corresponding to any horizontal line L2 of the recording medium 122b is transmitted through the cable 200, a clock signal in which a level 0 corresponding to a non-print portion and a level 1 corresponding to a print-portion are repeated as illustrated in FIG. 4D is transmitted. At this time, the two levels, that is, the level 0 and the level 1, of the clock signal are repeated, but lengths of the periods having the level 0 and the level 1 are different from each other. The lengths of the periods having the level 0 and the level 1 of the clock signal are different from each other because, in the plurality of dot regions B1 and C2 included in the horizontal line L2, the horizontal-direction size of the dot region B1 is larger than that of the dot region C2. If such a clock signal is analyzed in a frequency domain using an FFT algorithm, EMI generated in an entire frequency domain is significantly reduced as illustrated in FIG. 4E. Accordingly, an amount of EMI which can be generated when the halftone image is transmitted can satisfy the EMI standard defined in International Organization for Standardization, by performing the halftone process using the improved halftone table according to an embodiment of the present general inventive concept.

Whether the improved halftone table according to an embodiment of the present general inventive concept is applied is checked, by printing a test image and checking a print state of an output matter.

For example, if a gray image having a brightness of 50% is printed, a user observes the image using a magnifier and determines that the halftone table is applied if the dots printed on the recording medium include at least two types of dots.

An output matter which is obtained by printing a gray image having a brightness of 50% is scanned using a scanning device and the scanned image is magnified using a magnification program and is observed on a screen. Thus, whether the improved halftone table according to the present embodiment is applied is more accurately determined.

Although two types of dot regions are used to determine characteristics of the halftone table in the above-described embodiment, the present general inventive concept is not limited thereto. It will be understood by those skilled in the art that the EMI can be reduced by properly arranging various types of dot regions in the dot shape table illustrated in FIG. 3D.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it would be appreciated by those skilled in the art that changes may be made in these embodiments without departing from the principles and spirit of the general hinventive concept, the scope of which is defined in the claims and their equivalents.

What is claimed is:

1. An image forming apparatus, comprising:
    a halftone table including different types of dot regions according to a corresponding brightness level, the dot regions comprising geometric shapes having predetermined heights and widths and non-dot regions, such that first dot regions along a line corresponding to a scan line have geometric shapes different from geometric shapes of adjacent dot regions along the line, such that the geometric shapes comprise respective sides that are each either parallel or perpendicular to the scan line, and such that the dot regions disposed in a first diagonal direction with respect to the scan line comprise lines having only the first dot regions and only the adjacent dot regions, and the dot regions disposed in a second diagonal direction normal to the first diagonal direction comprise lines having the first dot regions alternating with the adjacent dot regions; and
    a halftone processor to binarize an original image using the halftone table.

2. The image forming apparatus according to claim 1, wherein indexes of the halftone table vary according to the dot regions and the non-dot regions.

3. The image forming apparatus according to claim 1, wherein the halftone table includes the different types of dot regions arranged in the halftone table at locations corresponding to the line, which is a horizontal line.

4. The image forming apparatus according to claim 1, wherein, the halftone table includes the different types of dot regions alternately arranged in the halftone table at locations corresponding to the horizontal line.

5. The image forming apparatus according to claim 1, wherein, in the halftone table, at least one of the plurality of dot regions has a height in a first direction greater than a height of another of the plurality of dot regions, and
    at least one of the plurality of dot regions has width in a second direction perpendicular to the first direction that is greater than a width of another of the plurality of dot regions.

6. An image forming apparatus comprising:
    a halftone table including at least two types of dot regions according to a corresponding brightness level, the two types of dot regions corresponding to two different geometric shapes having predetermined heights and widths and non-dot regions of a recording medium, such that first dot regions along a line corresponding to a scan line have geometric shapes different from geometric shapes of adjacent dot regions along the line, the halftone table being used when a halftone process is performed by a halftone processor, such that the geometric shapes comprise respective sides that are each either parallel or perpendicular to the scan line, and such that the dot regions disposed in a first diagonal direction with respect to the scan line comprise lines having only the first dot regions and only the adjacent dot regions, and the dot regions disposed in a second diagonal direction normal to the first diagonal direction comprise lines having the first dot regions alternating with the adjacent dot regions;
    the halftone processor to perform the halftone process with respect to the pixels of an original image using the halftone table; and
    a cable to transmit a clock signal which is obtained by performing the halftone process by the halftone processor and has a plurality of levels.

7. The image forming apparatus according to claim 6, wherein the plurality of levels include a first level corresponding to the dot region and a second level corresponding to the non-dot region, and a length of a period having the first level corresponding to the dot region varies according to shapes of the dot regions included on the line, which is a horizontal line.

8. An image forming apparatus, comprising:
    a video controller to binarize an original image and output the binarized image, using a halftone table including a plurality of different types of dot regions according to a corresponding brightness level, the dot regions corresponding to different geometric shapes having predetermined heights and widths and a plurality of non-dot regions;
    a cable to transmit the binarized image output from the video controller in series; and
    a laser scanning unit to irradiate laser beams in correspondence with the image received through the cable, such that first dot regions of a first type of the plurality of types along a line corresponding to a scan line have geometric shapes different from a geometric shapes of adjacent dot regions along the horizontal line, such that the geometric shapes comprise respective sides that are each either parallel or perpendicular to the scan line, and such that the dot regions disposed in a first diagonal direction with respect to the scan line comprise lines having only the first dot regions and only the adjacent dot regions, and the dot regions disposed in a second diagonal direction normal to the first diagonal direction comprise lines having the first dot regions alternating with the adjacent dot regions.

9. A method of controlling an image forming apparatus, the method comprising:
    performing a halftone process with respect to a test image using a halftone table;
    printing the image, which is obtained by performing the halftone process, on a recording medium;
    checking a print state of an output matter printed on the recording medium; and
    determining that the halftone table is applied if a plurality of dot regions printed on the recording medium include at least two types of dot regions according to a corresponding brightness level, the dot regions corresponding to different geometric shapes having predetermined heights and widths, such that first dot regions along a line corresponding to a scan line have geometric shapes different from geometric shapes of adjacent dot regions along the line, such that the geometric shapes comprise respective sides that are each either parallel or perpendicular to the scan line, and such that the dot regions disposed in a first diagonal direction with respect to the scan line comprise lines having only the first dot regions and only the adjacent dot regions, and the dot regions disposed in a second diagonal direction normal to the first diagonal direction comprise lines having the first dot regions alternating with the adjacent dot regions.

10. The method according to claim 9, wherein the test image is a gray image having a brightness of 50%.

11. The method according to claim 9, wherein the checking of the print state is performed by observing the image using a magnifier.

12. The method according to claim 9, wherein the checking of the print state comprising:
    scanning the printed output matter; and
    magnifying the scanned image using a magnification program and observing the scanned image on a screen.

13. A video controller usable with an image forming apparatus, the video controller comprising:
a halftone processor to binarize an original image by applying a corresponding brightness level to a halftone dot table to output the binarized image, the halftone processor to create the binarized image by associating dot regions of the halftone dot table with pixels of the original image,
wherein the dot regions comprise first dot regions and second dot regions adjacent to the first dot regions and disposed along a line corresponding to a scan line such that the first dot regions have geometric shapes having predetermined heights and widths different from than the second dot regions, such that the geometric shapes comprise respective sides that are each either parallel or perpendicular to the scan line, and such that the dot regions disposed in a first diagonal direction with respect to the scan line comprise lines having only the first dot regions and only the second dot regions, and the dot regions disposed in a second diagonal direction normal to the first diagonal direction comprise lines having the first dot regions alternating with the second dot regions.

14. An image forming apparatus, comprising:
a video controller comprising:
a halftone processor to binarize an original image by applying a corresponding brightness level to a halftone dot table to output the binarized image, the halftone processor to create the binarized image by associating dot regions of the halftone dot table with pixels of the original image such that the dot regions comprise first dot regions and second dot regions adjacent to the first dot regions and disposed along a line corresponding to a scan line such that the first dot regions have geometric shapes having predetermined heights and widths different from than the second dot regions, such that the geometric shapes comprise respective sides that are each either parallel or perpendicular to the scan line, and such that the dot regions disposed in a first diagonal direction with respect to the scan line comprise lines having only the first dot regions and only the second dot regions, and the dot regions disposed in a second diagonal direction normal to the first diagonal direction comprise lines having the first dot regions alternating with the second dot regions; and
a cable to transmit the binarized image output from the video controller in series; and
a laser scanning unit to irradiate laser beams in correspondence with the image received through the cable.

15. The image forming apparatus according to claim 14, wherein
the dot regions are obtained through a halftone table having characteristics corresponding to indexes applied to the pixels, and the indexes of the halftone table are related to respective shapes of the dot regions printed on a recording medium.

16. A method of operating image forming apparatus, the method comprising:
creating a binarized image by associating dot regions with pixels of an original image by applying a corresponding brightness level to a halftone dot table such that the dot regions comprise first dot regions and second dot regions adjacent to the first dot regions and disposed along a line corresponding to a scan line such that the first dot regions have geometric shapes having predetermined heights and widths different from than the second dot regions, the geometric shapes separated by non-dot regions, such that the geometric shapes comprise respective sides that are each either parallel or perpendicular to the scan line, and such that the dot regions disposed in a first diagonal direction with respect to the scan line comprise lines having only the first dot regions and only the second dot regions, and the dot regions disposed in a second diagonal direction normal to the first diagonal direction comprise lines having the first dot regions alternating with the second dot regions;
transmitting the binarized image in series; and
irradiating laser beams in correspondence with the transmitted binarized image.

17. A non-transitory computer-readable recording medium having embodied thereon a computer program to execute a method, wherein the method comprises:
creating a binarized image by associating dot regions with pixels of an original image by applying a corresponding brightness level to a halftone dot table such that the dot regions comprise first dot regions and second dot regions adjacent to the first dot regions and disposed along a line corresponding to a scan line such that the first dot regions have geometric shapes having predetermined heights and widths different from than the second dot regions, the geometric shapes separated by non-dot regions, such that the geometric shapes comprise respective sides that are each either parallel or perpendicular to the scan line, and such that the dot regions disposed in a first diagonal direction with respect to the scan line comprise lines having only the first dot regions and only the second dot regions, and the dot regions disposed in a second diagonal direction normal to the first diagonal direction comprise lines having the first dot regions alternating with the second dot regions;
transmitting the binarized image in series; and
radiating laser beams in correspondence with the transmitted binarized image.

* * * * *